Nov. 13, 1962  T. F. WINTERS  3,063,472
MACHINE FOR ASSEMBLING BEDSPRINGS
Filed June 9, 1958
7 Sheets-Sheet 1

INVENTOR.
Thomas F. Winters
BY
Townsend, Townsend + Caplan
Attorneys

INVENTOR.
Thomas F. Winters

Nov. 13, 1962 T. F. WINTERS 3,063,472
MACHINE FOR ASSEMBLING BEDSPRINGS
Filed June 9, 1958 7 Sheets-Sheet 3

INVENTOR.
Thomas F. Winters
BY
Townsend, Townsend & Caplan
Attorneys

Nov. 13, 1962   T. F. WINTERS   3,063,472
MACHINE FOR ASSEMBLING BEDSPRINGS
Filed June 9, 1958   7 Sheets-Sheet 4

INVENTOR.
Thomas F. Winters
BY
Townsend, Townsend & Caplan
Attorneys

INVENTOR.
Thomas F. Winters
BY
Townsend, Townsend & Caplan
Attorneys

Nov. 13, 1962  T. F. WINTERS  3,063,472
MACHINE FOR ASSEMBLING BEDSPRINGS
Filed June 9, 1958  7 Sheets—Sheet 6

*INVENTOR.*
Thomas F. Winters
BY
*Townsend, Townsend & Caplan*
*Attorneys*

United States Patent Office 3,063,472
Patented Nov. 13, 1962

3,063,472
MACHINE FOR ASSEMBLING BEDSPRINGS
Thomas F. Winters, San Francisco, Calif., assignor to Frank L. Wells Co., Kenosha, Wis., a corporation of Wisconsin
Filed June 9, 1958, Ser. No. 740,837
11 Claims. (Cl. 140—3)

This invention relates to a machine for assembling bedsprings. Reference is made to co-pending patent application Serial No. 662,283, filed May 28, 1957, now Patent No. 288,959, of which this application is a continuation-in-part.

A bedspring comprises a plurality of volute coil springs arranged in a pattern of longitudinal and transverse rows and secured in position relative to each other in such a manner as to permit limited relative movement of the springs under the stresses applied. The small-diameter end of each volute coil is secured to the intersection of reticulate wires. The present invention is more concerned with the securing of the large-diameter ends of the volute coils. Such large-diameter ends are each secured relative to the adjoining coils by a lacing wire which is crimped in the zone of each of the coils and which, in the position of use of the spring (as distinguished from the inverted position of manufacture, as hereinafter set forth), overlies the extreme edge of the largest coil of each coil spring plus a clip which extends transverse to the direction of the lacing wire and interconnects the adjacent lacing wires, the clips also underlying the extreme edge of the largest-diameter coil of each spring.

In prior conventional manufacture of springs, the clips heretofore mentioned have been manually applied around the crimped portions of the lacing wires. These manual operations have been the most labor-consuming part of the manufacture of bedsprings and also, by reason of the fact that such a large number of clips must be applied in a conventional spring, have caused the most difficulties in the manufacture and inspection of such springs.

The present invention comprises a mechanism which automatically locates the lacing wires relative to the coils and elevates the crimped portions relative to the coils so as properly to receive the clips, and then installs and bends the clips.

Accordingly, one of the principal features and advantages of the invention is the saving in labor entailed thereby and the increase in speed of production.

Another feature of the invention is the uniformity of attachment of the clips installed in accordance with this invention over manual methods of clip attachment.

A still further object of the invention is to provide a means for actuating a plurality of the aforementioned mechanisms so that a complete spring consisting of a plurality of rows of coils, each row having a plurality of coils, may be assembled in one operation.

A still further object of the invention is the provision of means for holding the large-diameter end coils against a support so that intermediate lacing wires extending transverse to the lacing wires previously described may be installed and properly interlocked into the spring assembly.

Another feature of the invention is the provision of mechanisms associated with each end of all, or at least some, of the lacing wires, to wrap the end of each lacing wire around the edge or frame wire which is located at the perimeter of the spring. Preferably the wrapping mechanisms are actuated by the same means which actuates the clip-forming means heretofore described.

Another feature of the invention is the provision of an improved bedspring wherein each coil spring is locked four ways instead of two, by the provision of transverse lacing wires preferably interfitting with the longitudinal lacing wires. This construction provides a firmer spring, distributing the load among more adjacent coils than conventional lacing, thereby permitting the use of fewer coils.

The foregoing invention may be employed in the manufacture of bed and upholstery springs and is hereinafter described in detail in such use. However, essentially the same machine may be employed to assemble the spring construction of an inner spring mattress. The springs employed in a mattress differ from those in a conventional bedspring, in that they are of a double volute shape (the diameter decreasing from a maximum to a minimum midway the length of the spring and then increasing to the opposite end). The machine which is the subject of the invention may be employed to interlace the springs at one end (i.e., one surface of the mattress) and then the assembly is inverted and the same machine may be employed to interlace the opposite ends of the springs.

By the use of the transverse lacing wires heretofore mentioned the necessity of stuffing the inside of the volute springs with filler material is obviated and this reduces the cost of manufacture, in that the amount of stuffing employed is materially reduced and the labor of inserting the stuffing in the springs is reduced.

Other objects of the present invention will become apparent upon reading the following specification and referring to the accompanying drawings in which similar characters of reference represent corresponding parts in each of the several views.

Figure 1:
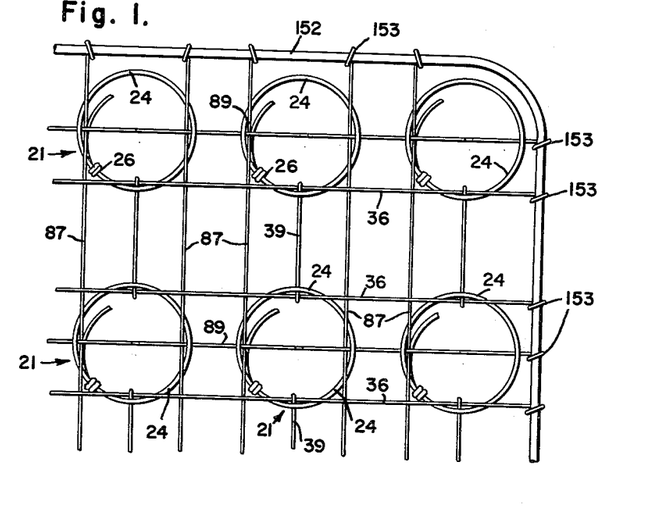
FIG. 1 is a plan of a bedspring construction fabricated in accordance with this invention.
Figure 2:
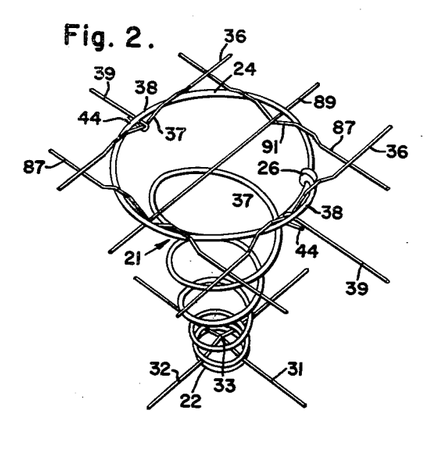
FIG. 2 is an enlarged perspective view of the coil spring and surrounding lacing wires and clips.

Turning now to the construction shown in FIGS. 1 and 2, it will be seen that the spring construction is comprised of a plurality of volute coil springs 21, each having a small-diameter end 22 which terminates in an outwardly diverging pigtail 23. The large-diameter end 24 of volute coil 21 terminates in a wrap or knot 26 wound around the next largest-diameter coil. Coils 21 are arranged in regular longitudinal and transverse rows, as well understood in the art to which this invention appertains. In the position of use, small-diameter ends 22 are lowermost, as illustrated in FIG. 2, but in the operation of the mechanism, as hereinafter set forth, the coils are inverted from the position shown in FIGS. 1 and 2.

The first step in the assembly of the spring, as conventionally practiced, is the formation of a reticulate pattern of crimped, overlapping, longitudinal and transverse wires 31 and 32, with crimped portions overlapping at the intersections 33. The small-diameter end 22 is screwed into the intersection 33, pigtail 23 facilitating this operation. This operation is conventionally conducted manually at a stage in the construction of the spring prior to the stage with which the present invention is concerned. The springs are then inverted, with the largest-diameter portions lowermost, and lacing wires 36, each formed with a crimp 37, are installed underlying the extreme edge of each largest-diameter coil 24, lacing wires 36 assuming a chordal position which is very near to tangency, so that only a small arc 38 of coil 24 is intercepted by wire 36. Crimp 37 extends up above the elevation of largest-diameter coil 24 and receives clip 39, the ends 44 of which are bent upwardly around crimped portion 37 and then inwardly. Clip 39 interconnects adjacent coils and extends transverse to the direction of lacing wires 36.

The mechanism is preferably assembled in a frame which accommodates a plurality of coils in a line. Thus, in one conventional bedspring construction, forty-five coils 21 are employed, arranged in five rows consisting of lines of nine coils each. The present invention therefore may consist of a machine to tie all forty-five coils together and thus consists of five substantially identical mechanisms each accommodating nine coils in line. It will be understood that the number of coils per row may be varied and the number of mechanisms to accommodate a row may also be varied. The mechanism for each of the nine springs is substantially identical and hence only one is thereinafter described.

Figure 7:
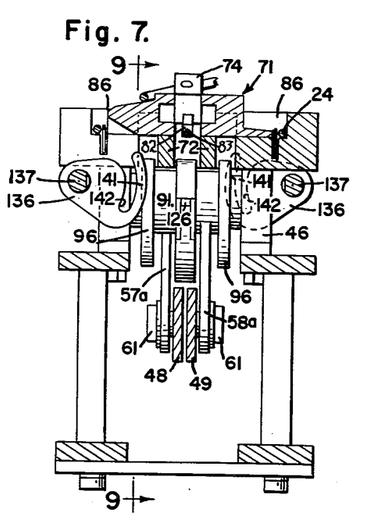
FIG. 7 is a vertical sectional view taken substantially along the line 7—7 of FIG. 6.
Figure 8:
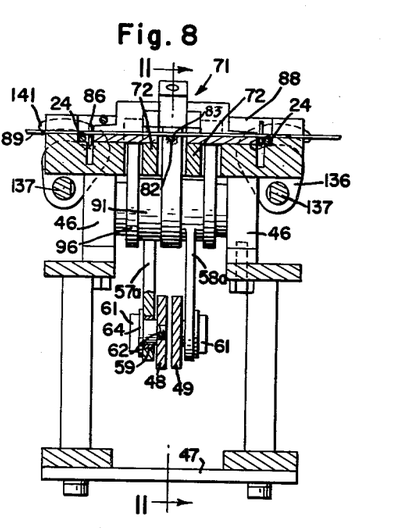
FIG. 8 is a view similar to FIG. 7 taken substantially along the line 8—8 of FIG. 6.
Figure 9:
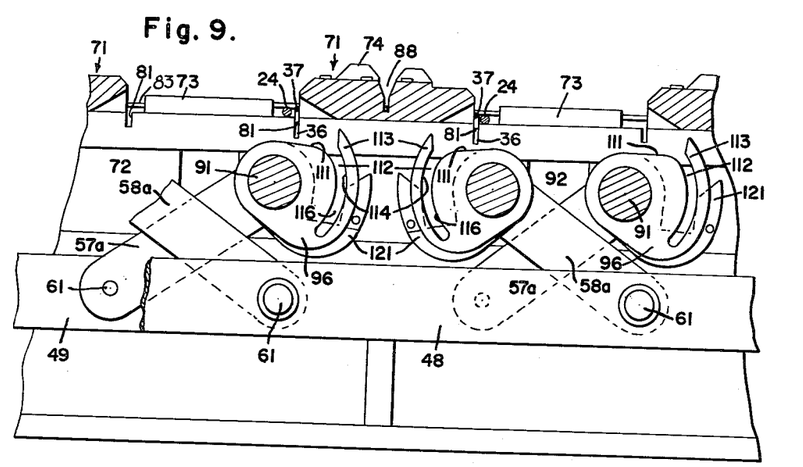
FIG. 9 is a longitudinal vertical sectional view taken substantially along the line 9—9 of FIG. 7 and showing the mechanism at the beginning of the cycle of operation.

For each row there is a frame extending longitudinally, consisting of vertical side frame members 46 suitably tied together by ties 47 and extending along opposite sides of the lines. Reciprocating longitudinally of the line is a pair of actuating bars 48—49. At one end of the line is a hydraulic cylinder 51, which actuates each of the five rows simultaneously, as hereinafter appears. The force of cylinder 51 is transmitted to one bar 48 of each row. At one end of the line is a pair of transverse shafts 53—54 carrying meshing gears 56. Each shaft 53, 54 carries a depending link 57, 58, respectively, the lower end of which is connected to one of the actuating bars 48, 49. Thus, when bar 48 is moved endwise of the line, the other bar 49 is moved in the opposite direction. Bars 48, 49 operate the various mechanisms hereinafter described in detail. One means of attachment of links 57, 58 to bars 48, 49 is shown in detail in FIGS. 7 and 8, the links 57a, 58a of said figures being similar to links 57, 58. The lower end of link 57a is formed with an aperture in which is placed a bushing 59. A screw 61 having a reduced end 62 is threaded into a tapped hole in bar 48. An enlarged diameter neck 63 on screw 61 fits inside bushing 59. Washer 64 and the enlarged head 66 on screw 61 hold the bar 48 and link 57a in proper alignment for pivotal movement relative to each other as bar 48 reciprocates.

Mounted on frame 46, for each coil 21 is a head 71. The various parts associated with each head 71 form a unit. Heads 71 are located on top of and fixed to longitudinal guides 72 which extend to either side of each head 71 on either side of the center line and points midway between heads 71. Intermediate heads 71 are spacers 73, also above and fixed to guides 72. Each head 71 has a central coil support 74 which has the external configuration to accommodate the large-diameter coil 24 of the volute coil 21. Two cutouts 76 are formed in the support 74, either of which may accommodate the knot 26. Thus, referring to FIG. 6, the spring 21 may be initially installed either in the position shown or rotated 180°.

The head 71 is formed with vertical slots 81 extending transversely of the machine, which accommodate the transverse crimped wires 36 to which the clips 39 are applied. Such slots 81 are spaced adjacent either end of the head 71. The head 71 is further cut away with a central longitudinal slot 82 which receives the longitudinal wire 83 from which the clips 39 are formed. Spacers 73 are formed with longitudinal slots 84 having end enlargements 85 which also accommodate wire 83. The head 71 is formed with a pair of longitudinal vertical slots 86 on either side thereof to accommodate longitudinal crimped lacing wires 87 which extend longitudinally on either side of the line. Head 71 is also formed with a transverse central slot 88 which receives intermediate transverse lacing wire 89, which interlaces with longitudinal wires 87 as well as coil 24. For such purpose wire 87 is formed with a crimp 91 at the intersection of wire 89.

Associated with each head 71 is a pair of longitudinally spaced transverse shafts 91, 92 journalled in sides 46. Depending from each shaft 91, 92 is a link 57a, 58a which is fastened to one of the actuating bars 48, 49 as previously described. Each of the pair of shafts 91, 92 is connected to a different bar 48, 49, respectively, and hence the shafts oscillate in opposite directions and in synchronism. Each shaft 91, 92 carries a pair of hold-down levers 96 located spaced inwardly of slots 86. Between the two hold-down levers 96 shafts 91 and 92 carry a cutoff lever 97. The shapes of the hold-down levers 96 and cutoff levers 97 are of considerable importance to an understanding of the invention and are hereinafter described in detail.

Figure 10:
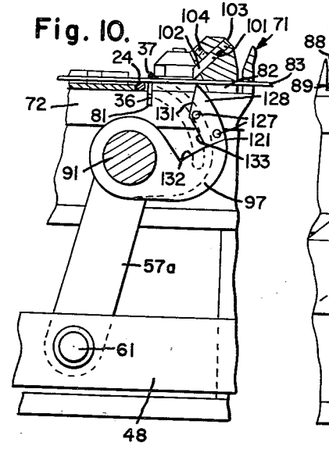
FIG. 10 is a fragmentary view of a portion of the construction of FIG. 9 showing the mechanism at the completion of the coil-clamping operation and at the commencement of the clip-cutting operation.
Figure 11:
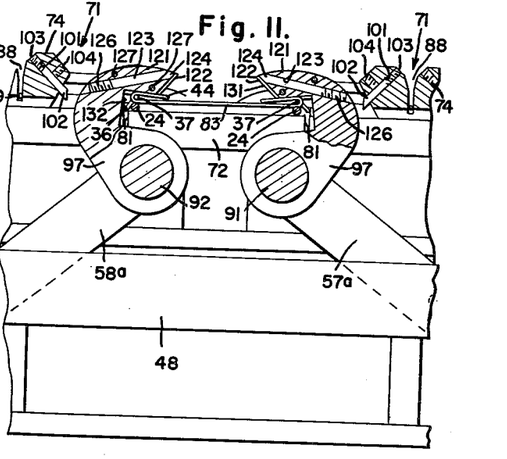
FIG. 11 is a sectional view taken substantially along the line 11—11 of FIG. 8 and showing the mechanism at the completion of the clip-forming portion of the cycle of operation.

Support 74 is formed with a pair of oppositely directed, downwardly, outwardly disposed slots 101 which receive cutoff bits 102 of tool steel which cooperate with the cutoff levers 97 to cut the clip wire (FIGS. 10 and 11). Each bit 102 is adjusted by means of adjustment screw 103 threaded into slot 101 and, when once adjusted in position, is held in place by set screw 104 threaded at right angles to slot 101.

Each of levers 96 is preferably formed of flat stock and keyed to shaft 91 or 92. A cam surface 111 is formed along one edge of levers 96 with the radial distance from the center line of shaft 91 or 92 to surface 111 increasing in the direction of rotation of lever 96. Cam surface 111 functions to engage wire 36 in slot 81 and gradually to raise the same until crimped portion 37 is elevated above the level of coil 24. Beyond cam surface 111 is an arcuate slot 112 having its center of curvature on the center line of shaft 91 or 92 and defining a finger portion 113 which functions to hook over end 24 at arc 38 and hold coil 24 down against head 71. Thus slot 112 has an inner edge 116 (which forms in effect a continuation of cam surface 111 and bears against the underside of wire 36 to retain the same in elevated position) and an outer edge 114 which hooks over coil 24 and prevents it from rising as wire 36 exerts upward pressure.

Cutoff levers 97 are likewise keyed to shafts 91 and 92, there being a pair of such levers 97 associated with each head. Each lever 97 is provided with a cutoff finger 121. The outer end of the finger 121 is formed with a groove 122 having a width equal to the width of the clip wire 83 so that wire 83 may be received therein and restrained against lateral displacement. Finger 121 is also formed with an angularly disposed groove 123 carrying cutoff bit 124 of tool steel. Bit 124 is adjusted by means of adjustment screw 126 threaded into the opposite end of groove 123. When once adjusted, bit 124 is held in place by means of clamp screws 127 which clamp bit 124 between finger 121 and plate 128 and prevent movement thereof. The relationship of bits 102 and 124 is best shown in FIG. 10, wherein it will be seen that they shear the clip wire 83. The end of clip wire 83 between the point of shear and the adjacent head is discarded and falls down in the slot 82 between the heads. The remaining piece of wire 83, which forms clip 39, is held in place by the bottom coil 24 and crimp 37 of crimped lacing wire 36. As shafts 91, 92 continue their movement, the clip wire is guided into the groove 122 and is then bent around crimp 37, as best shown in FIG. 11. The cutoff lever 97 is formed with an inclined end 131 and wide arcuate slot 132 to accommodate the bending of end 44 of the clip. The upper face 133 of inner slot is slanted as shown in FIG. 11 so that a neat bend of the clip is accomplished.

Figure 6:
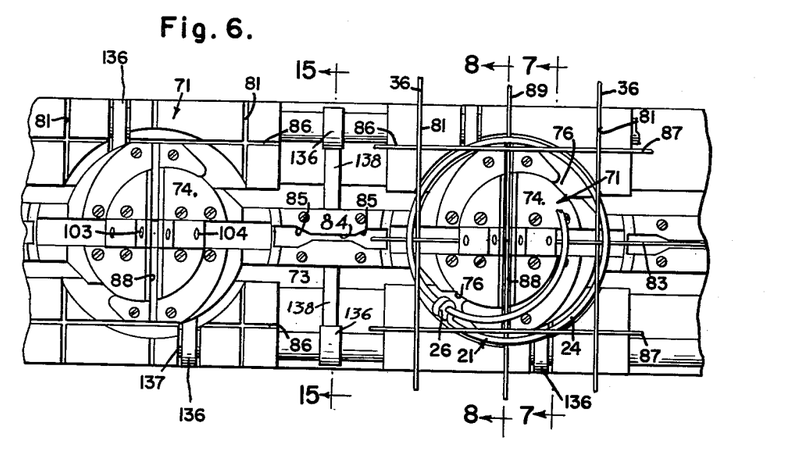
FIG. 6 is a top plan of the structure of FIG. 5.
Figure 15:
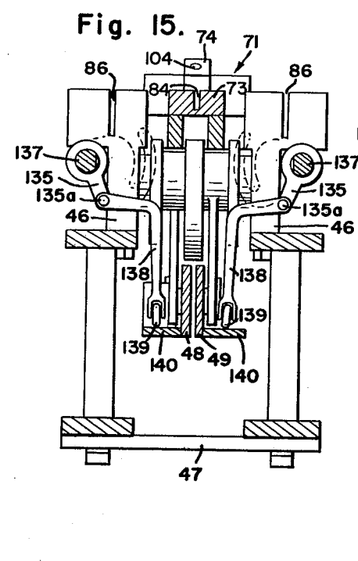
FIG. 15 is a transverse sectional view taken substantially along line 15—15 of FIG 6 showing means for actuating the side clamps at the commencement of the cycle of operations.
Figure 16:
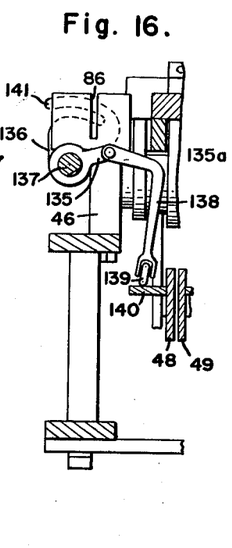
FIG. 16 is a fragmentary view similar to FIG. 15 showing completion of the side clamping operation.

Each head 71 is also provided with a pair of transverse hold-down levers 136 similar in construction and function to hold-down levers 96. Each such lever 136 is mounted on a longitudinally extended shaft 137 which oscillates in timed sequence to the oscillation of shafts 91 and 92. One means of oscillating shafts 137 is shown in FIGS. 15 and 16. Shaft 137 is provided with crank 135 connected by pin 135a to angularly disposed cam follower lever 138 having cam follower roller 139 at its lower end riding on cam 140 attached to bar 48 or 49. As bars 48 and 49 move longitudinally, the ramp of cam 140 causes lever 138 to lift and fall and this oscillates shaft 137. The finger 141 of transverse hold-down lever 136 engages over the lowermost coil 24 supported on head 71 and, as the left shaft 137 continues to turn in a counterclockwise direction, as viewed in FIG. 7, the coil is pulled downwardly, radial slot 142 being located to accommodate such movement. When the coil is held down, transverse intermediate lace wire 89 may be inserted through slot 88. As shown in FIG. 6, the transverse hold-down levers 136 are preferably in position, one being disposed toward one end of the head 71 and the other in the opposite direction.

Figure 12:
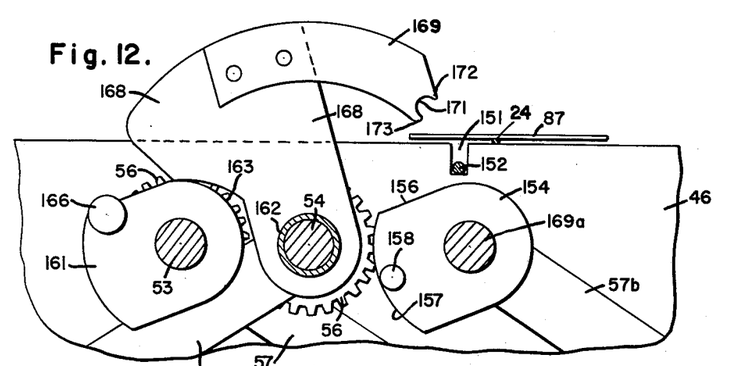
FIGS. 12, 13 and 14 are fragmentary vertical sectional views showing sequentially steps in the wrapping of the end of the lacing wires around the frame wire.
Figure 13:
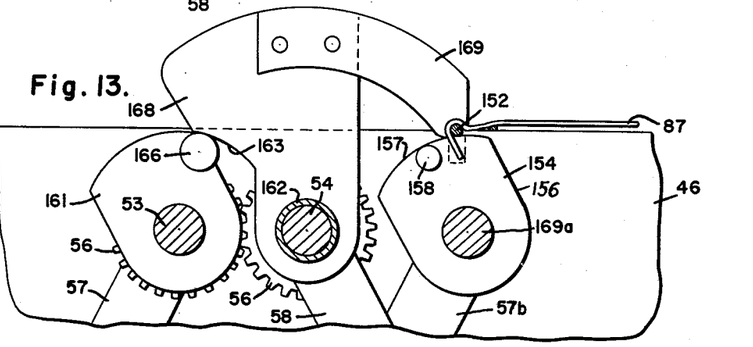
Figure 14:
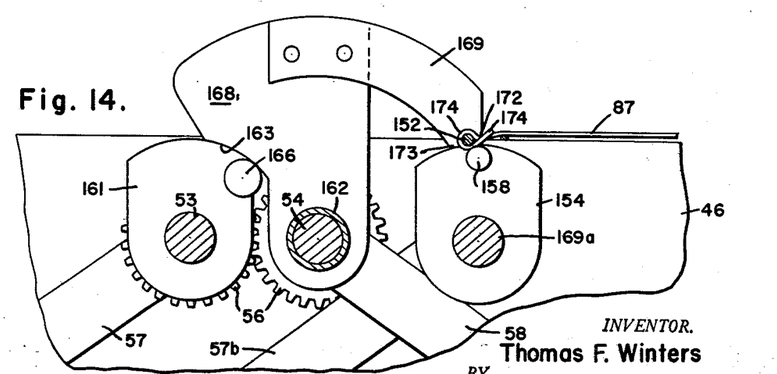

The frame members 46 are provided with vertical notches 151 at either end to receive the large-diameter edge or frame wire 152 which extends around the periphery of the spring and to which the longitudinal and transverse lacing wires 87, 36 and 89 are fastened by wraps 153. Thus, preferably at each end of each of such wires 87, 36 and 89, a mechanism similar to that shown in detail in FIGS. 12 to 14, is located, there shown as forming a wrap 153 in a longitudinal wire 87. Shaft 169a is located slightly inside of slot 151 and carries a cam member 154 having a cam 156 which, in proper sequence in the operation of the machine, engages under edge wire 152 and lifts it up to the top of the slot 151 and into engagement with the underside of the lacing wire 87. Shaft 169a has a lever 57b connected to bar 48 so that cam member 154 is oscillated in tuned relation with movement of bar 48. A radial portion 157 of member 154 maintains wire 152 raised as member 154 continues to turn. Member 154 also carries near its outer end a pin 158 which, at a later stage of the cycle of operation, completes the wrap 153 as hereinafter described. Shaft 53 also carries member 161 having on its outer end a cam follower roller 166. Lever 168 oscillates around the axis of shaft 54 as a center, with bushing 162 interposed so that lever 168 and shaft 54 turn entirely independently of each other. Lever 168 has a cam surface 163 engaged by roller 166 so that the movement of lever 168 is controlled by oscillation of shaft 53 and the shape of surface 163.

As shaft 53 oscillates, a movement is imparted to lever 168 in timed sequence to the operation of the machine which causes a forwardly projecting arm 169 on lever 168 to move toward and away from slot 151. The outer end of arm 169 is formed with a round groove 171 and at the upper side of the groove is a blade 192 and at the lower side of the groove 171 is a rounded bending anvil 173. When the edge wire 152 is raised to the position of FIG. 13, blade 172 engages lacing wire 87 and by reason of clamping action between blade 172 and edge wire 152, the lacing wire 87 is held against longitudinal movement. The rounded groove 171 causes the free end 174 of the lacing wire 87 to be bent around the outside of edge wire 152. The rounded anvil 173 bends the end 174 of the lacing wire 87 further around the edge wire 152, and finally the pin 158 on cam member 158 clamps the end 174 in the position shown in FIG. 14. It will be noted that the clearance between edge wire 152 and pin 158 is less than the thickness of lacing wire 87, thereby flattening the lacing wire therebetween and preventing its natural resiliency from loosening wrap 153.

Figures 18, 19:
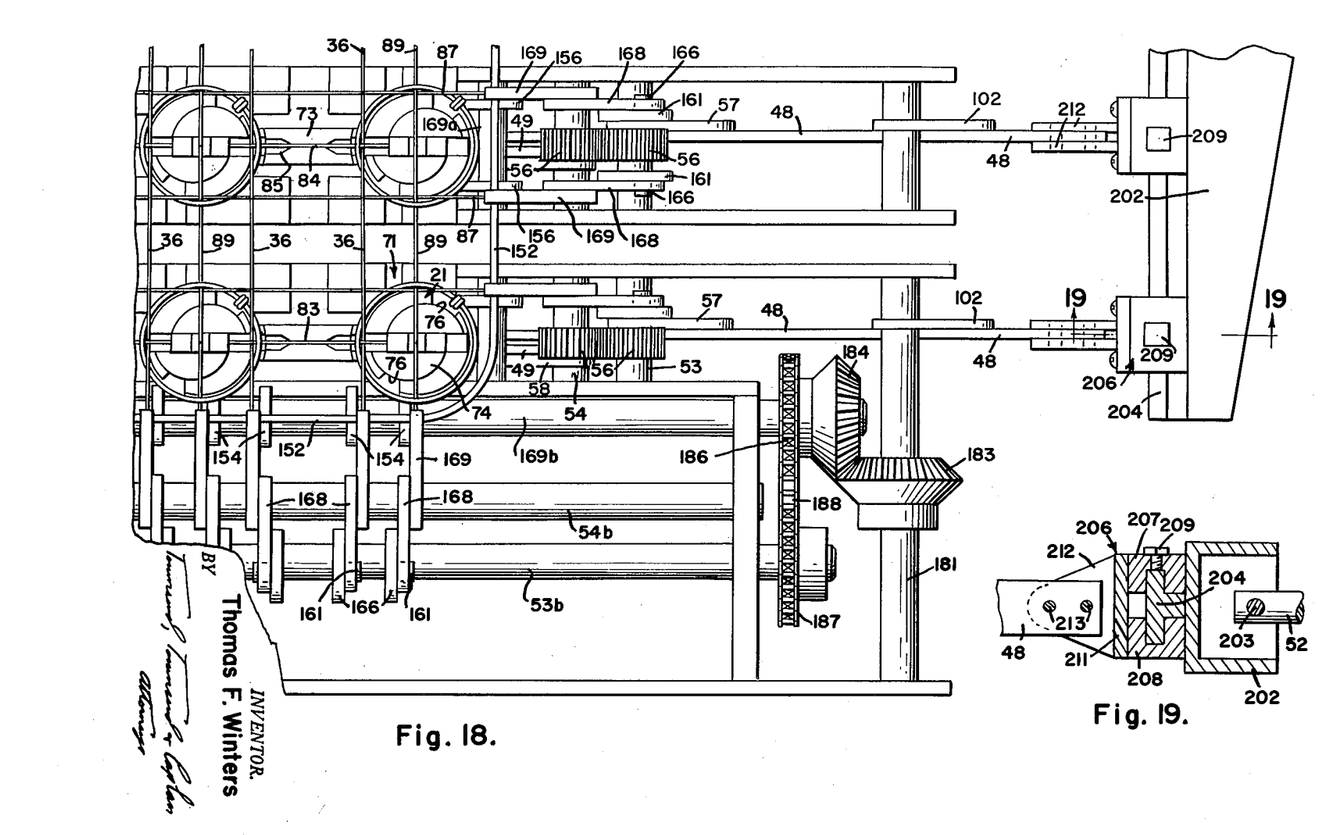
FIG. 18 is a fragmentary plan of a machine for assembling an entire bedspring.
FIG. 19 is a fragmentary sectional view taken substantially along line 19—19 of FIG. 18.

The ends of transverse lacing wires 36 and 89 are also bent around the outside of edge wire 152 on the sides of the spring. As best shown in FIG. 18, extending longitudinally of the machine are disposed shafts 53b, 54b and 169b, similar in function to shafts 53a, 54a and 169a. Extending transversely at one end of the machine is a shaft 181, having a crank link 182 depending therefrom and fastened to one of the bars 48. Thus, shaft 181 oscillates in timed sequence to the operation of the machine. Shaft 181 has a bevel gear 183 which meshes with bevel gear 184 on shaft 169b. Shaft 169b also carries a sprocket 186 and shaft 53b carries a sprocket 187, the sprockets 186 and 187 being interconnected by chain 188. Thus, oscillatory movement of shaft 181 is transmitted to the shafts 53b and 169b. Positioned opposite the end of each transverse lacing wire 36 or 89 is a wrap forming mechanism, similar to that shown in FIGS. 12 to 14. In essence, shaft 169b carries a member 154 similar in function and shape to the member 154 carried by shaft 169a. Shaft 53b carries a member 161, having a roller 166 which actuates lever 168 on idler shaft 54b. The projecting arm 169, attached to lever 168 is similar in shape and function to that shown in FIGS. 12 to 14, and accomplishes the wrap in the same manner as heretofore described with respect to lacing wires 87. Accordingly, by the mechanism heretofore described, all of the lacing wires may be wrapped around the edge wire 152 simultaneously and in substantially the same way.

Figure 17:
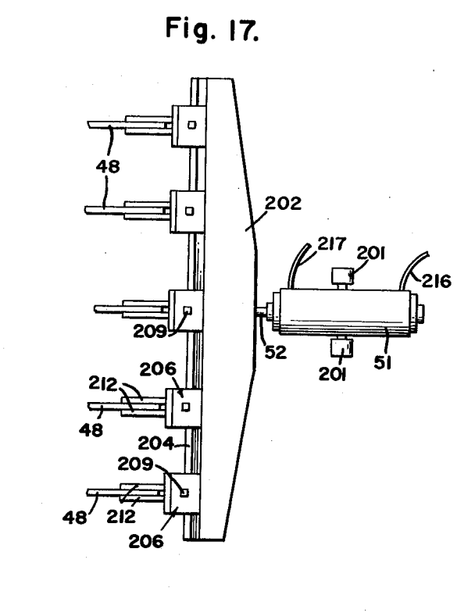
FIG. 17 is a top plan of the end of a spring assembly machine showing actuation of a machine for assembling a plurality of rows of coils.

As has been stated, a single cylinder 51 may be employed to actuate simultaneously five or more separate rows of coils. Referring now to FIGS. 17 to 19, inclusive, it will be seen that the cylinder 51 is mounted by means of gimbals 201 to a stationary support. The piston rod 52 is fixed to a transverse structural member 202 by means of pivot pin 203. Along the inner edge of member 202 is welded a T-shaped bar 204, which functions as a trackway for slidable members 206. Each member 206 has an upper and a lower traveler 207 or 208, which is grooved out to receive one of the flanges of T-shaped member 204. A set screw 209 in member 207, when tightened, engages member 204 and holds member 206 in position. However, when the screw 209 is loosened, the member 206 can be moved along the length of member 205 to the desired position. This adjustability permits the alteration of the spacing between rows of coils when such alteration is necessary, either by the insertion of additional rows of coils, or when some special construction is required, as in upholstery springs and the like. Member 206 has a face 211 from which extend fabricated brackets 212 to which are bolted, by means of bolts 213, the ends of bars 48. Hence, when hydraulic fluid is delivered by hose 216 to cylinder 51, piston rod 52 is projected, and this moves structural member 202 to the left, as viewed in FIGS. 17 and 18 and pushes bar 48 to the left.

The sequence of the operation of the machine therefore is as follows, At the commencement of the cycle, piston rod 52 is retracted in hydraulic cylinder 51. The operator places the rectangularly shaped spring, consisting of edge wire 152, in the slots 151 on the machine. The transverse crimp wires 36 are fitted into the slots 81. The operator also places on each of the supports 71 the lower ends 24 of the coil springs 21 with knots 26 fitting into notches 76. Thereupon the first movement of the cycle commences and piston rod 52 in cylinder 51 is projected part way, causing bars 48, 49 to move in opposite directions longitudinally and each shaft 91, 92, 137 to oscillate to its first position of rest (about 40 degrees of movement). During this movement clamps 96 and 136 engage the large-diameter coil 24 and hold it securely in place against head 71. Crimp wires 36 are raised in slots 81 and edge wire 152 is also raised in slot 151.

When the machine reaches the first position of rest, the operator inserts link wires 83 in slots 82. Thereupon piston rod 52 is again partially projected and bars 48, 49 and shafts 91, 92, 137 move to the second position of rest (a movement of about 15 degrees). During the movement between first and second positions of rest, levers 97 cut the center link wire 83. When the machine reaches the second position of rest, the operator inserts center transverse lacing wire 89 in slot 88. Thereupon the machine advances from the second position of rest to its terminal position of movement (about 55 degrees), and during this movement clip ends 44 and wraps 153 are bent. At the terminal position of rest, the fabricating operation is completed and thereupon the cylinder 51 retracts piston rod 52 and the parts return to their initial position. The completed assembly is then removed and the cycle is ready for the next operation.

Figure 3:
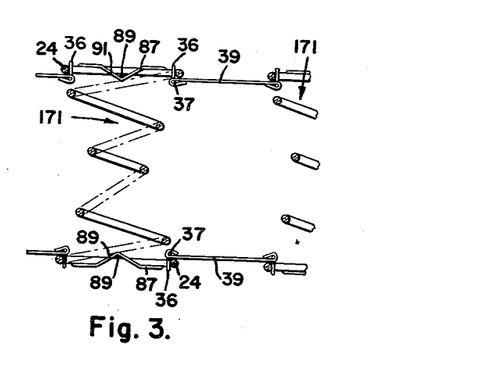
FIG. 3 is a fragmentary vertical sectional view through a portion of an inner spring mattress spring construction formed in accordance with this invention.
Figure 4:
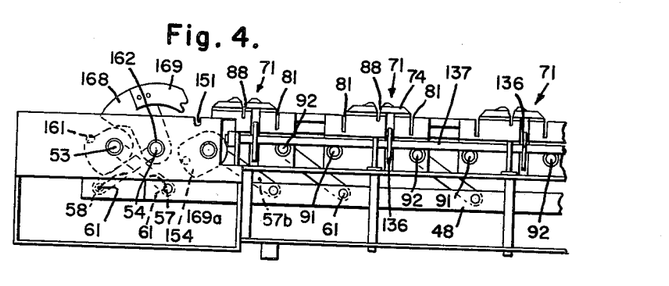
FIG. 4 is a side elevation of a portion of the instant machine.
Figure 5:
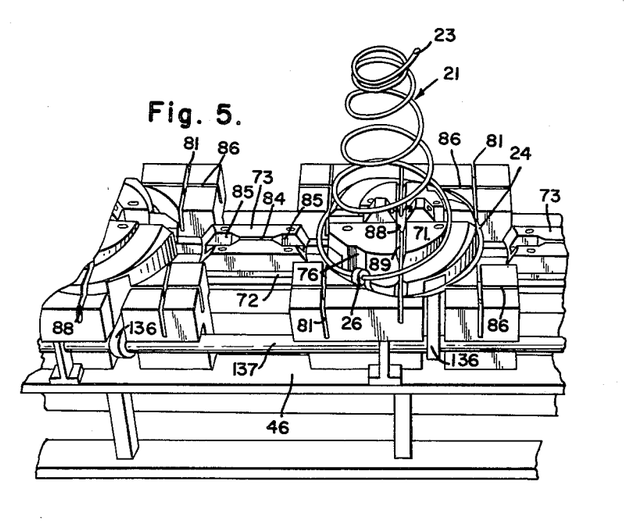
FIG. 5 is an enlarged fragmentary perspective view of a portion of the structure of FIG. 4.

As shown in FIG. 3, a spring construction for an inner spring mattress may be assembled in accordance with this invention. A spring 171 of such inner spring construction is generally similar to spring 21, but is tied at both ends instead of merely at one end. The crimped transverse lacing wires 36 and longitudinal lacing wires 87, as well as the intermediate transverse lacing wires 89, are duplicated on the upper and lower sides of the spring for the mattress, and the crimped portions 37 of the lacing wires 36 are interconnected by clips 39. Accordingly, similar reference numerals are employed in FIG. 3, it being understood that the construction is generally similar on both the upper and lower surfaces.

Although the foregoing invention has been described in some detail by way of illustration and example for purposes of clarity of understanding, it is understood that certain changes and modifications may be practiced within the spirit of the invention and scope of the appended claims.

What is claimed is:

1. A machine for assembling coil springs, comprising a plurality of longitudinally spaced heads extending in longitudinal direction and each shaped to receive a large-diameter end coil of a volute coil spring and to hold said coil spring in position, each said head being formed with at least two transverse slots on opposite sides to receive first lacing wires and one central longitudinal slot to receive a clip-forming wire, a pair of transversely extending shafts for each said head, at least one hold-down lever for each said shaft, each said hold-down lever having a finger shaped to hold down said end coil against said head, at least one cutoff lever for each said shaft having a cutting edge cooperating with a portion of said head to shear said clip-forming wire held in said longitudinal slot and having a bending surface to bend a clipped end of said clip-forming wire backwards upon itself and around a portion of a first lacing wire held in one of said transverse slots, and actuating means for imparting oscillatory motion to each of said shafts in opposite directions, said actuating means comprising a pair of longitudinally extending bars, a plurality of links interconnecting one of said bars with one of each pair of said shafts, and means for imparting movement to said bars in opposite directions.

2. A machine according to claim 1, in which said last-named means comprises a pair of meshing gears on a pair of said transverse shafts, means for moving one of said bars in a substantially longitudinal direction and means including said gears to impart movement of said last mentioned bar to the other of said bars in an opposite direction.

3. A machine according to claim 1, in which each said head is formed with a pair of second longitudinal slots on opposite sides of said central longitudinal slot to receive longitudinal lacing wires and with a central transverse slot to receive an intermediate transverse lacing wire, and which further comprises a pair of longitudinal shafts on opposite sides of the machine, means for oscillating said longitudinal shafts in timed relation to said transversely extending shafts, and a second hold-down lever at each said head having a second finger shaped to hold down said end coil.

4. A machine according to claim 3, in which each said second hold-down lever is formed with a cam surface shaped to engage and raise wires held in said second longitudinal slots.

5. A machine according to claim 1, in which said machine is formed with a boundary slot at least one end to receive a boundary wire and which further comprises means driven in timed relation to said actuating means to bend an end of one of said lacing wires around said boundary wire.

6. A machine according to claim 1, in which said machine is formed with a boundary slot at least one end to receive a boundary wire and which further comprises a cam on one shaft of a pair of shafts shaped to raise a boundary wire in said boundary slot, a third transverse shaft, means for oscillating said third transverse shaft in timed relation to said actuating means, and a lever on said third transverse shaft, said lever having a gripping portion shaped to grip a lacing wire against said boundary wire and at least partially to bend said lacing wire around said boundary wire.

7. A machine according to claim 6, in which said cam is provided with a pin positioned to squeeze the end of said lacing wire against the underside of said boundary wire after said lacing wire has been bent around said boundary wire.

8. Means for securing a lacing wire to a boundary wire in a spring construction, comprising a frame, means in said frame for locating a boundary wire in position, a first and a second shaft in said frame parallel to said boundary wire, means for imparting opposite oscillatory motion to said first and second shafts, a third shaft parallel to and intermediate said first and second shafts, a lever on said third shaft, said lever having a sharp end and a groove having an arcuate configuration, means for imparting motion from said first shaft to said lever to bring said sharp end into contact with said lacing wire positioned across said boundary wire to restrain longitudinal movement of said lacing wire and then to bend said lacing wire around said boundary wire, and means carried by said second shaft to squeeze the bent end of said lacing wire against said boundary wire.

9. Means according to claim 8, in which said frame is formed with a slot initially to receive said boundary wire and which further comprises a cam on said second shaft to raise said boundary wire in said slot.

10. Means for securing a lacing wire to a boundary wire in a spring construction, comprising a frame, means in said frame for locating a boundary wire in position, a lever having a sharp end and a groove having an arcuate configuration, means for moving said lever toward said boundary wire to bring said sharp end into contact with said lacing wire positioned across said boundary wire to restrain longitudinal movement of said lacing wire and then to force a portion of said lacing wire into said groove and bend said lacing wire around the outside of said boundary wire, means for squeezing the end of said lacing wire against said boundary wire while said boundary wire is held by said lever.

11. Means for securing a lacing wire to a boundary wire in a spring construction, comprising a frame, means in said frame for locating a boundary wire in position, a lever having a sharp end and a groove having an arcuate configuration, means for moving said lever toward said boundary wire to bring said sharp end into contact with said lacing wire positioned across said boundary wire to restrain longitudinal movement of said lacing wire and then to force a portion of said lacing wire into said groove and bend said lacing wire around the outside of said boundary wire, means for bending the end of said lacing wire at an acute angle to the major portion of said lacing wire.

References Cited in the file of this patent

UNITED STATES PATENTS

| | | |
|---|---|---|
| 819,671 | Pennepacker | May 1, 1906 |
| 1,062,597 | Lewis | May 27, 1913 |
| 1,390,814 | Rhenstrom | Sept. 13, 1921 |
| 2,015,927 | Gilmore | Oct. 1, 1935 |
| 2,330,244 | Saval | Sept. 28, 1943 |
| 2,654,403 | Roe | Oct. 6, 1953 |
| 2,676,623 | Bloss | Apr. 27, 1954 |
| 2,888,959 | Winters | June 2, 1959 |

UNITED STATES PATENT OFFICE
CERTIFICATE OF CORRECTION

Patent No. 3,063,472                          November 13, 1962

Thomas F. Winters

It is hereby certified that error appears in the above numbered patent requiring correction and that the said Letters Patent should read as corrected below.

Column 1, line 12, for "288,959" read -- 2,888,959 --; column 3, line 33, for "upwarlly" read -- upwardly --; line 49, for "thereinafter" read -- hereinafter --; column 8, lines 30 and 36, after "slot", each occurrence, insert -- at --.

Signed and sealed this 23rd day of April 1963.

(SEAL)
Attest:

ERNEST W. SWIDER                         DAVID L. LADD
Attesting Officer                            Commissioner of Patents